United States Patent [19]

Rule et al.

[11] Patent Number: 4,857,629
[45] Date of Patent: Aug. 15, 1989

[54] PROCESS FOR THE PREPARATION OF COPOLY(ARYLENE SULFIDE)

[75] Inventors: Mark Rule; David R. Fagerburg; Joseph J. Watkins, all of Kingsport, Tenn.

[73] Assignee: Eastman Kodak Company, Rochester, N.Y.

[21] Appl. No.: 308,918

[22] Filed: Feb. 13, 1989

Related U.S. Application Data

[63] Continuation-in-part of Ser. No. 246,902, Sep. 16, 1988, abandoned.

[51] Int. Cl.⁴ .............................................. C08G 75/14
[52] U.S. Cl. .................................... 528/217; 528/219; 528/222; 528/226; 528/378; 528/389; 528/364
[58] Field of Search ............... 528/378, 388, 389, 217, 528/219, 222, 226, 364

[56] References Cited

U.S. PATENT DOCUMENTS

| | | | |
|---|---|---|---|
| 3,843,614 | 10/1974 | Doorakian | 528/389 |
| 3,878,176 | 4/1975 | Moberly | 528/389 |
| 3,919,177 | 11/1975 | Campbell | 528/389 |
| 4,451,640 | 5/1984 | Shiiki et al. | 528/389 |
| 4,605,733 | 3/1986 | Seratone | 528/389 |
| 4,786,713 | 11/1988 | Rule et al. | 528/389 |

Primary Examiner—John C. Bleutge
Assistant Examiner—David W. Woodward
Attorney, Agent, or Firm—Charles R. Martin; William P. Heath, Jr.

[57] ABSTRACT

A process for preparing a copoly(arylene sulfide) corresponding to the structure $$[(-A-S-)_{1-x}(-A-S-S-)_x]_n$$

wherein x is in the range of 0.5 to 0.001 by reacting a mixture of a diiodoaromatic compound and elemental sulfur in the absence of a basic material and in the presence of a catalytic amount of iron.

15 Claims, No Drawings

PROCESS FOR THE PREPARATION OF COPOLY(ARYLENE SULFIDE)

This application is a continuation-in-part of Ser. No. 246,902 filed Sept. 16, 1988, now abandoned.

The invention relates to a process for the preparation of a copoly(arylene sulfide) by heating a diiodoaromatic compound in the presence of elemental sulphur and a catalytic amount of iron.

Poly(arylene sulfide) (PAS) resins are thermoplastic polymeric materials with good thermal stability, unusual insolubility, resistance to chemical environments and inherent flame resistance. PAS resins additionally have good electrical insulative properties which make them ideal for electrical and electronic applications. Their excellent resistance to chemical degradation makes them ideal for use in chemical environments which involve organic solvents and strong mineral acids, such as coatings for pipes, tanks, pumps and other equipment.

Poly(phenylene sulfide) (PPS) is a commercial product which is generally produced by reacting p-dichlorobenzene with sodium sulfide in a polar organic solvent to produce PPS and the by-product sodium chloride. This process is known as the Macallum polymerization procedure and the basic process is disclosed in U.S. Pat. No. 2,513,188 and U.S. Pat. No. 2,583,941. An improvement on the Macallum polymerization procedure involves adding N-haloamides as catalysts in the procedure (U.S. Pat. No. 3,285,882). The Macallum polymerization utilizes only chloroaromatic compounds.

The PPS which is formed in the Macallum process has only a modest molecular weight on the order of 10,000–40,000 and has relatively low melt viscosity. Higher molecular weights can be obtained by heating the PPS in the presence of oxygen. During heating, the molecular weight of the PPS increases due to a variety of chemical reactions including oxidation, crosslinking and chain extension. These curing reactions result in polymers which have inherent brittleness and reduced drawing capability while only achieving modest increases in molecular weight. Additionally, PPS which is produced by polymerization in the presence of sulfide and/or hydrosulfide salts, such as sodium sulfide and sodium hydrosulfide, has a residual content of inorganic salt present in the polymer. These residual salts are, for example, sodium chloride and sodium sulfide resulting from the combination of the sodium cation with chlorine or sulfide from the starting materials. The presence of these residual salts in the polymer increases the corrosive nature of the polymer and can cause a deterioration in the drawing or spinning characteristics of the polymer. Residual salts can also result in breakages in the spun fibers and additionally contribute to plugging and clogging of the spinneret holes.

An additional problem with poly(arylene sulfide) produced by the Macallum process is the effect of residual salts on the electrical properties. The presence of residual salts results in polymers with increased moisture adsorption and electrical activity, which are detrimental to applications requiring highly insulating characteristics. Although extensive extraction reduces the salt content of PPS produced by the Macallum process, complete removal of these salts is commercially infeasible.

An additional problem with PPS produced by the Macallum process is the high rate of crystallization of these polymers. Although some applications do require high rates of crystallization, many applications require much slower rates of crystallization. These polymers contain no substantial quantities of disulfide units.

U.S. Pat. No. 4,645,826 discloses a process of preparing "ultra-high molecular weight" linear PAS by first preparing a prepolymer with a melt viscosity between 5–3,000 poise and then performing a liquid-liquid two-phase polymerization. Only dichloroaromatic compounds are disclosed and the prepolymer is formed using a conventional alkaline metal sulfide. The "ultra-high molecular weight" polymers have melt viscosities of only tens of thousands of poise. The prepolymer is formed by a standard Macallum polymerization in the presence of an alkali metal sulfide. Accordingly, the polymers produced will suffer from the problems associated with residual salt content noted above. These polymers are also thought to contain no substantial quantities of disulfide units.

U.S. Pat. No. 4,645,825 also discloses poly(arylene sulfide) produced using dichloroaromatic or dibromoaromatic compounds and polymerizing in the presence of conventional alkaline metal sulfides or hydrosulfides. Although polymers with relatively high molecular weights and melt viscosities can be produced by this process, the presence of residual inorganic salts in the polymer results in inferior corrosion characteristics as well as poor spinning and drawing capability. These polymers are also thought to have no substantial quantities of disulfide units.

Copending U.S. application Ser. No. 312,289 discloses preparation of co(polyarylene sulfides) by heating a diiodoaromatic compound in the presence of elemental sulfur.

This process can be used to prepare poly(arylene sulfide) which do not contain substantial quantities of alkali metals and has an adjustable rate of crystallization. The copolymers prepared using the process of this invention do not contain substantial quantity of alkali metals simply because no alkali metal is used in the process used to prepare the polymer. Although Applicants do not wish to be limited to any particular theory, it is believed that the variable rate of crystallization of the copolymer prepared using the process is due to the presence of small amounts of (—A—S—S—) or disulfide units in the polymer chain. Thus, the polymers prepared by this process can be considered to be copolymers. The presence of these disulfide units in the copolymer do not materially affect other important properties of the polymer, such as glass transition temperature, solvent resistance, thermal stability, and oxidative stability.

The vast majority of units in the copolymer prepared by the process of this invention are the (—A—S—) unit and the number of (—A—S—S—) or disulfied units are small compared to the number of (—A—S—) units. Generally, the number of (—A—S—S—) units is in the range of 0.5 to 0.001, based on the combined number of both (—A—S—) and (—A—S—S—) units. Thus, the copolymer prepared by the process of the invention can be represented as

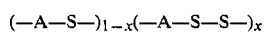

(—A—S—)$_{1-x}$(—A—S—S—)$_x$ where x is in the range of 0.5 to 0.001. The sequence of (—A—S—) and (—A—S—S—) units is thought to be random throughout the molecular chain. When x is in the range of 0.5 to 0.2 the polymers obtained when A is p-phenylene are amorphous and can be crystallized only with difficulty. When x is in the range of 0.2 to 0.1 the polymers obtained can be thermally crystallized and have crystalline melting points of 230-260 degree C. When x is in the range of 0.1 to 0.05 the polymers obtained have moderate crystallization rates and the crystallized polymers can be annealed to high crystalline melting points (280°-290° C.) and show Tch (temperature of crystallization on heating) and Tcc (temperature of crystallization on cooling) at increasingly lower and higher temperatures, respectively, indicative of increasing rates of crystallization. When x is in the range of 0.05 to 0.001 the crystallization rate increases rapidly with decreasing x.

The following table more clearly shows the effect of disulfide units on the crystallization rate of poly(phenylene sulfide):

| X | Tg | Tcc | Tch | Tm | T ½(130° C.) |
|---|---|---|---|---|---|
| 0.25 | 88 | — | — | 238 | |
| 0.14 | 90 | — | — | 251 | |
| 0.12 | 94 | — | — | 255 | 132 Seconds |
| 0.10 | 92 | 168 | — | 243 | |
| 0.064 | 94 | 142 | 231 | 280 | |
| 0.055 | 95 | 140 | 226 | 278 | |
| 0.049 | 95 | 126 | 240 | 280 | |
| 0.000 | 91 | 126 | 242 | 278 | 12 Seconds |

The size of the polymer chain can conveniently be expressed as the total number of each kind of unit in the chain. Therefore, the copoly(arylene sulfide) prepared by the process of this invention can be more specifically expressed as corresponding to the structure $$[(-A-S-)_{1-x}(-A-S-S-)_x]_n$$

wherein n, the degree of polymerization, is at least 200 and is preferably in the range of 500 to 5,000 as determined by melt viscosity measurement at 300° C. The degree of polymerization when A is p-phenylene can be calculated using the relationship log (n)=1.473+0.2873×log (melt viscosity) where melt viscosity is measured in poise.

In the process used to prepare the co(polyarylene sulfide) of the present invention a diiodoarylene compound corresponding to the structure

I—A—I where A is a divalent arylene radical is reacted with elemental sulfur to produce a substantially linear copoly(arylene sulfide) having both (—A—S—) units and (—A—S—S—) units in the presence of an effective amount of catalyst.

Diiodoaromatic compounds which can be utilized in the present process include unsubstituted or substituted aromatics which have two iodine substituents. Suitable diiodoaromatic compounds include hydrocarbon aromatics, nitrogen-containing aromatics, sulfur-containing aromatics and oxygen-containing aromatics. Typical hydrocarbon aromatics include benzene and biphenyl, and condensed ring aromatics such as naphthalene and anthracene. Typical sulfur-containing aromatics include, for example, thiophene and benzothiophene. Typical nitrogen-containing aromatics include pyridine and quinoline. Suitable oxygen-containing aromatics are, for example, furan, dibenzofuran, etc. Substituted diiodoaromatic compounds suitable for use with the present invention include aromatic sulfones, diarylethers, diarylcarbonyls, diarylsulfides and the like.

The aromatic starting materials may be substituted by one or more alkyl groups, preferably alkyl groups having from 1-6 carbon atoms. Specially preferred alkyl groups are methyl, ethyl, propyl and butyl groups. There is no limitation on the spatial arrangement of the substituents, for example, the substituents may be on a carbon adjacent to an iodine bearing carbon or may be on a carbon atom further removed from the iodine bearing carbon.

Additional substituents on the aromatic compounds may include phenyl, halogen, hydroxy, nitro, amino, $C_{1-6}$ alkoxy, and carboxylate and carboxylic acid substituents, as well as aryl sulfones and aryl ketones.

Preferred diiodoaromatic compounds are the diiodobenzenes, diiodonaphthalenes, diiodobiphenyls, diiodo diphenyl ethers and diiodotoluenes which may be unsubstituted or substituted with any of the substituents noted above.

Specific diiodoaromatic compounds suitable for the present invention include p-diiodobenzene, m-diiodobenzene, p,p'-diiodobiphenyl, m,p'-diiodobiphenyl, p,p'-diiododiphenyl sulfone, p,p'-diiododiphenyl ether, 2,6-diiodonaphthalene, and p,p'-diiodobenzophenone. p-Diiodobenzene, p,p'-diiodobiphenyl, and p,p'-diiododiphenyl ether are most preferred.

The diiodoaromatic starting materials of the present invention may be prepared by any suitable process. For example, the diiodoaromatic compounds may be prepared by standard liquid or gas phase iodination reactions. Although the diiodoaromatic compounds may be prepared by any such process, the preferred method of preparing the diiodoaromatic starting materials is that disclosed in copending application Ser. Nos. 912,806, filed Sept. 9, 1986, now U.S. Pat. No. 4,746,758; 026,896, filed Mar. 26, 1987; 029,959, filed Mar. 25, 1987, now U.S. Pat. No. 4,795,737, and 029,898, now U.S. Pat. No. 4,792,642, filed Mar. 25, 1987. Alternatively, the diiodoaromatic compounds may be produced by a transiodination process such as that disclosed in copending application Ser. Nos. 029,899, filed Mar. 25, 1987, now U.S. Pat. No. 4,792,641; 029,956, filed Mar. 25, 1987, now U.S. Pat. No. 4,806,698; and 029,949, filed Mar. 25, 1987, now U.S. Pat. No. 4,806,697. The disclosures of these copending applications are incorporated herein by reference for a more complete description of these preferred processes.

Sulfur is reacted as elemental sulfur and may consist of any of the standard forms which are possible for elemental sulfur. That is, the sulfur may be present in any of its allotropic modifications such as orthorhombic cyclooctasulfur ($S_8$) or any other cyclic elemental sulfur such as any of the cyclosulfur species having 6–12 sulfur atoms. Additionally, any crystalline form of sulfur may be used in the present reaction. Surprisingly, impurities in the elemental sulfur do not appear to affect the efficiency or selectivity of the present polymerization reaction. The sulfur preferably has a purity of about 98%–100%, although sulfur having a lower degree of purity may be used. This lack of sensitivity to the presence of impurities in the sulfur is advantageous to the present process when used as a commercial process since highly purified sulfur is not required and the associated expense is not incurred.

An important aspect of this invention is the use of an iron catalyst to enhance the rate of reaction. The iron can be in many different forms and the exact form of the iron is unimportant. Example of suitable forms of iron are iron halides, iron oxides, iron carboxylates, iron sulfides, iron sulfates, and elemental iron. Iron halides such as ferrous iodide or ferric chloride, are preferred. Ferrous iodide is the most preferred.

The amount of catalyst can be any quantity which results in an enhanced rate of reaction. Generally 0.1 to 5,000 parts per million, based on the combined weight of diiodoaromatic compound and sulfur can be used. Preferably the catalyst is in the range of 1 to 1,000 weight parts per million. Most preferably 1 to 100 weight parts per million can be used.

In the process used to prepare the co(polyarylene sulfide) of this invention sulfur reacts with a diiodoaromatic compound, eliminating elemental iodine and forming the PAS as shown below.

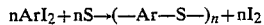

$$nArI_2 + nS \rightarrow (-Ar-S-)_n + nI_2$$

The formation of polymer is not sensitive to the relative stoichiometry of the diiodoaromatic compound and sulfur. Accordingly, an excess of sulfur or an excess of diiodoaromatic compound may be used in the polymerization process. When excess sulfur is used, some disulfide linkages are observed in the polymer. Decreasing amounts of sulfur result in decreasing levels of disulfide linkages in the final polymer. When the diiodoaromatic compound is present in excess, polymerization to high polymer can still occur, if the excess diiodoaromatic compound is removed during final polymerization.

The polymerization reaction is preferably carried out in the absence of solvent by merely heating and reacting the sulfur and diiodoaromatic compound. Under these conditions, the diiodoaromatic compound itself acts as a solvent for the sulfur which is melted thereby forming a substantially homogeneous solution enabling a facile and complete reaction.

In another embodiment, the diiodoaromatic compound can be dissolved in an organic solvent which is inert to the reaction conditions, i.e., which is inert to reaction with iodine and sulfur. High boiling inert aromatic solvents are preferred such as, for example, aromatic hydrocarbons, diarylsulfides, diarylethers and diarylsulfones. It is preferable to use a solvent which corresponds to the diiodoaromatic compound which is being polymerized. Thus, for example, in the polymerization of diiodobenzene with sulfur, one might use benzene, toluene or naphthalene as a solvent.

It is also possible to perform the polymerization reaction of the present invention by solid state polymerization. Solid state polymerization enables very high molecular weights and melt viscosities to be achieved. After an initial melt polymerization (or alternatively solution polymerization) has been performed, the product is cooled to a solid state. Further heating and polymerization in the solid state under vacuum or inert gas flow dramatically increases the molecular weight allowing weight average molecular weights in excess of 100,000 to be achieved. It is significant to note that substantially no cross-linking occurs during the solid state or melt polymerization processes. The very high molecular weight copolymers which are produced after the solid state polymerization are still substantially linear and have excellent film and fiber forming properties.

During the polymerization reaction between the diiodoaromatic compound and sulfur elemental iodine is produced and evolves from the reaction melt, solution, or solid. Removal of the elemental iodine provides a driving force for completion of the polymerization reaction. The iodine may be removed by passing a stream of air or an inert gas such as nitrogen or argon over or through the reaction mass at atmospheric or superatmospheric pressure or alternatively by applying a vacuum to the reaction apparatus. The elemental iodine may be collected and used as a commercial product or as a reactant for further chemical processes. The present reaction, therefore, does not result in wasted reaction products since both the PAS and elemental iodine are useful commercial chemical products.

The polymerization reaction is generally conducted at a temperature above about 175° C. Although the reaction may be conducted at temperatures below 175° C., the polymerization reaction is much slower. There is no particular upper temperature limit on the polymerization reaction, which may be conducted at any temperature below the decomposition temperature of the diiodoaromatic compound. For most polymerization reactions, temperatures in the range of about 175°–400° C. will be suitable, although for particular diiodoaromatic compounds temperatures in excess of 400° C. may be used. Particularly preferred temperature ranges are from about 180°–350° C.

The reaction is generally conducted for a period of at least one-half hour and is continued for up to about 10 hours or longer, and reaction times approaching infinity are theoretically possible. The exact reaction time will depend on the diiodoaromatic compound, the engineering requirements of the process, and the specific molecular weight, viscosity and physical properties of the desired product.

The polymerization reaction may be carried out in a batch reaction vessel or may be carried out as a semi-continuous or continuous process. Agitation of the reaction mixture is optional, however agitation or stirring assists in the production and yield of the polymeric product. Agitation of the reaction mixture may be accomplished by any known method, such as mechanical stirring or by passing a stream of inert gas through the reaction mixture.

In a preferred embodiment, the polymerization reaction is conducted on a continuous basis with the diiodoaromatic compound and sulfur being combined in a continuous staged reactor to form a reaction melt. An inert gas such as nitrogen or argon is passed through the melt, preferably in a countercurrent direction, thereby accomplishing agitation and mixing of the reaction melt and at the same time removing the elemental iodine which is evolved and sweeping it out of the reactor. Alternatively, a vacuum may be applied to the reactor to remove the elemental iodine as it is generated. It should be noted that the reaction proceeds equally well under batch conditions and combinations of batch and continuous processes are considered to be well within the scope of the present invention.

The copolymer produced by the process of this invention is useful for preparation of various shaped articles such as pellets, fibers and molded articles. The polymer can be prepared into these shaped articles by conventional processes, such as injection molding and melt spinning.

Since there are no alkali metal containing materials in the reaction, there are no substantial quantities of alkali metal in the polymer matrix. Typically, there is less than 100 weight parts per million alkali metal, preferably less than 10 weight parts per million, based on the weight of the copoly(arylene sulfide). The absence of substantial quantities of alkali metal greatly enhance the capability of the polymer to be melt processed, particularly melt spun into fibers.

The copoly(arylene sulfide) and particularly the copoly(phenylene sulfide) produced by the process of this invention have an adjustable rate of crystallization, due to the presence of the disulfide linkages. Since the concentration of disulfide linkages can be varied over a wide range, the rate of crystallization can be readily adjusted to suit the technological application without unduely sacrificing other desirable characteristics of the polymer. In addition, the rate of crystallization can be further enhanced by the addition of conventional nucleating aids such as talc, terephthalic acid, silica or the like for those applications where extremely fast rates are desired.

An important aspect of this invention is reacting the diiodoaromatic compound and elemental sulphur in the absence of a basic material. Examples of basic materials which are not present in our reaction include dithionates, lithium hydroxide, sodium hydroxide, potassium hydroxide, rubidium hydroxide, cesium hydroxide, magnesium hydroxide, calcium hydroxide, strontium hydroxide, sodium hydroxide, sodium carbonate, potassium carbonate and the like.

Other features of the invention will become apparent in the course of the following descriptions of exemplary embodiments which are given for illustration of the invention and are not intended to be limiting thereof.

EXAMPLES

In the following examples, the catalytic activity of iron was examined by measuring the rate of iodine evolution associated with formation of the copoly(arylene sulfide) polymer from mixtures containing 10.0 grams of p-diiodobenzene, 1.00 grams sulfur, and the indicated amount of iron held at 235° C. at atmospheric pressure in a thermostatted heat block. There was no basic material present in the reaction medium. The results are tabulated below:

| Example No. | ppm Fe | Form Added | Rate Constant[1] | Corr Coeff |
|---|---|---|---|---|
| 1 | — | — | 0.0038 | 0.986 |
| 2 | 5 | Metal | 0.0045 | 0.995 |
| 3 | 50 | Metal | 0.0095 | 0.996 |
| 4 | 500 | Metal | 0.0296 | 0.972 |
| 5 | 5000 | Metal | 0.0301 | 0.989 |
| 6 | 1750 | FeCl$_3$ | 0.0312 | 0.986 |
| 7 | 50 | Fe(phth)[2] | 0.0102 | 0.986 |
| 8 | 500 | FeSO$_4$ | 0.0275 | 0.986 |
| 9 | 50 | Fe$_2$O$_3$ | 0.0086 | 0.991 |
| 10 | 50 | FeI$_2$ | 0.0127 | 0.985 |

[1]Lmol$^{-1}$ min$^{-1}$
[2]Iron Phthalocyanine

Obviously, numerous modifications and variations of the present invention are possible in light of the above teachings. It is therefore to be understood that within the scope of the appended claims, the invention may be practiced otherwise than as specifically described herein.

We claim:

1. A process for producing elemental iodine and a copoly(arylene sulfide) corresponding to the structure:

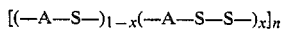

wherein A is a divalent substituted or unsubstituted aromatic radical, x is in the range of 0.5 to 0.001 and n is at least 200,
comprising
   (1) reacting at a temperature above about 175° C. a mixture of a diiodoaromatic compound and elemental sulfur in the absence of a basic material and in the presence of a catalytic amount of iron to produce the elemental iodine and the copoly(arylene sulfide), and
   (2) recovering the elemental iodine.

2. The process of claim 1 wherein the diiodoaromatic compound is selected from the group consisting of hydrocarbon diiodoaromatics, sulfur-containing diiodoaromatics, nitrogen-containing diiodoaromatics and oxygen-containing diiodoaromatics.

3. The process of claim 2 wherein said diiodoaromatic compound is substituted with one or more alkyl groups having 1-6 carbon atoms.

4. The process of claim 1 wherein said diiodoaromatic compound is substituted with a member selected from the group consisting of phenyl, halogen, hydroxy, nitro, amino, C$_{1-6}$ alkoxy, carboxylate, carboxylic acid, aryl sulfone and aryl ketone groups.

5. The process of claim 1 wherein said diiodoaromatic compound is selected from the group consisting of diiodobenzenes, diiodonaphthalenes, diiodobiphenyls and diiodotoluenes.

6. The process of claim 1 wherein said diiodoaromatic compound is p-diiodobenzene, m-diiodobenzene, p,p'-diiodobiphenyl, p,p'-diiododiphenyl ether, or 2,6-diiodonaphthalene.

7. The process of claim 1 wherein said reacting step is conducted at a temperature between about 175°–400° C.

8. The process of claim 7 wherein said reacting step is conducted at a temperature between about 180°–350° C.

9. The process of claim 1 wherein said reacting step is conducted in the presence of an inert solvent.

10. The process of claim 1 wherein said reacting step is a solid state polymerization.

11. The process of claim 1 wherein said reacting step is conducted as a continuous process and wherein an inert gas is passed through said reaction mixture.

12. The process of claim 1 wherein the amount of iron is in the range of 0.1 to 5,000 weight parts per million, based on the weight of the diiodoaromatic compound and sulfur.

13. The process of claim 12 wherein the amount of iron is in the range of 1 to 1,000 weight parts per million.

14. The process of claim 1 wherein the iron is in the form of an iron halide, iron oxide, iron sulfide or elemental iron.

15. A process for producing elemental iodine and a copoly(phenylene sulfide) corresponding to the structure

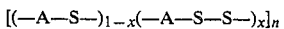

where A is a divalent unsubstituted phenylene radical, x is in the range of 0.5 to 0.001, and n is at least 400,
comprising
   (1) reacting in the absence of a basic material a mixture of diiodobenzene, elemental sulfur and iron at a temperature in the range of 180° to 350° C., wherein the iron is in the range of 1 to 100 weight parts per million based on the weight of p-diiodobenzene and sulfur to produce the elemental iodine and the copoly(phenylene sulfide), and
   (2) recovering the elemental iodide.

* * * * *